(12) United States Patent
Sander et al.

(10) Patent No.: US 9,020,162 B2
(45) Date of Patent: *Apr. 28, 2015

(54) ELECTRONIC DEVICE AND EXTERNAL EQUIPMENT WITH DIGITAL NOISE CANCELLATION AND DIGITAL AUDIO PATH

(75) Inventors: Wendell B. Sander, Los Gatos, CA (US); Jeffrey J. Terlizzi, San Francisco, CA (US); Brian Sander, San Jose, CA (US); David Tupman, San Francisco, CA (US); Barry Corlett, Brisbane, CA (US)

(73) Assignee: Apple Inc., Cupertino, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 13/494,679

(22) Filed: Jun. 12, 2012

(65) Prior Publication Data

US 2012/0250913 A1     Oct. 4, 2012

Related U.S. Application Data

(62) Division of application No. 12/622,378, filed on Nov. 19, 2009, now Pat. No. 8,223,986.

(51) Int. Cl.
*H04R 1/10* (2006.01)
*A61F 11/06* (2006.01)
(Continued)

(52) U.S. Cl.
CPC ........... *H04R 1/1083* (2013.01); *H04M 1/6008* (2013.01); *H04M 1/6058* (2013.01);
(Continued)

(58) Field of Classification Search
CPC ................. G10K 2210/1081; G10K 2210/108; G10K 11/1788

USPC ........ 381/74, 71.6, 334, 71.1, 71.2, 122, 371; 700/94

See application file for complete search history.

(56) References Cited

U.S. PATENT DOCUMENTS 4,767,168 A   8/1988  Grandy
4,869,566 A   9/1989  Juso et al.
(Continued)

FOREIGN PATENT DOCUMENTS

EP   1 182 848 A1   2/2002
EP   1 318 576 A1   6/2003
(Continued)

*Primary Examiner* — Xu Mei
*Assistant Examiner* — Douglas Suthers
(74) *Attorney, Agent, or Firm* — Park, Vaughan, Fleming & Dowler LLP

(57) ABSTRACT

Electronic devices and accessories are provided that may communicate over wired communications paths. The electronic devices may be portable electronic devices such as cellular telephones or media players and may have audio connectors such as 3.5 mm audio jacks. The accessories may be headsets or other equipment having mating 3.5 mm audio plugs and speakers for playing audio. Microphones may be included in an accessory to gather voice signals and noise cancellation signals. Analog-to-digital converter circuitry in the accessory may digitize the microphone signals. Digital voice signals and voice noise cancellation signals can be transmitted over the communications path and processed by audio digital signal processor circuitry in an electronic device. Digital-to-analog converter circuitry in the accessory may convert digital audio signals to analog speaker signals. Digital noise cancellation signals may use digital noise signals to cancel noise from digital audio signals that have been received from an electronic device.

17 Claims, 8 Drawing Sheets

(51) Int. Cl.
*G10K 11/16* (2006.01)
*H03B 29/00* (2006.01)
*H04R 3/00* (2006.01)
*H04R 1/02* (2006.01)
*H04R 9/06* (2006.01)
*H04M 1/60* (2006.01)

(52) U.S. Cl.
CPC ......... *H04R2410/05* (2013.01); *H04R 2420/03* (2013.01); *H04R 2420/09* (2013.01); *H04R 2460/03* (2013.01); *H04R 2499/13* (2013.01)

(56) References Cited

U.S. PATENT DOCUMENTS

| | | | |
|---|---|---|---|
| 4,896,939 | A | 1/1990 | O'Brien |
| 4,902,092 | A | 2/1990 | Grandy |
| 5,473,702 | A * | 12/1995 | Yoshida et al. ............. 381/94.7 |
| 6,109,797 | A | 8/2000 | Nagura et al. |
| 6,141,424 | A | 10/2000 | Takiguchi et al. |
| 6,238,249 | B1 | 5/2001 | Kuwamura |
| 6,599,025 | B1 | 7/2003 | Deutsch |
| 6,947,766 | B2 | 9/2005 | Chan et al. |
| 7,156,690 | B2 | 1/2007 | Tolmie |
| 2002/0159716 | A1 | 10/2002 | Ohbayashi et al. |
| 2002/0177364 | A1 | 11/2002 | Mine et al. |
| 2003/0016920 | A1 | 1/2003 | Sohmura et al. |
| 2004/0204081 | A1 | 10/2004 | Kim |
| 2007/0025561 | A1 | 2/2007 | Gauger et al. |
| 2007/0054705 | A1 | 3/2007 | Liow et al. |
| 2007/0177741 | A1 | 8/2007 | Williamson |
| 2008/0318629 | A1 * | 12/2008 | Inha et al. .................... 455/557 |
| 2009/0110404 | A1 | 4/2009 | Agevik |
| 2009/0175456 | A1 | 7/2009 | Johnson |
| 2009/0180659 | A1 | 7/2009 | Sander et al. |
| 2009/0191914 | A1 | 7/2009 | Stahl |
| 2010/0130198 | A1 | 5/2010 | Kannappan et al. |

FOREIGN PATENT DOCUMENTS

| | | |
|---|---|---|
| EP | 1 257 017 B1 | 7/2004 |
| GB | 2449083 | 11/2008 |
| JP | 2000-315553 A | 11/2000 |
| WO | 2004016037 | 2/2004 |
| WO | 2008028175 | 3/2008 |
| WO | 2008058327 | 5/2008 |

* cited by examiner

ELECTRONIC DEVICE AND EXTERNAL EQUIPMENT WITH DIGITAL NOISE CANCELLATION AND DIGITAL AUDIO PATH

This application is a division of patent application Ser. No. 12/622,378, filed Nov. 11, 2009, which is hereby incorporated by referenced herein in its entirety. This application claims the benefit of and claims priority to patent application Ser. No. 12/622,378, filed Nov. 11, 2009.

BACKGROUND

Electronic devices such as computers, media players, and cellular telephones typically contain audio jacks. Accessories such as headsets have mating plugs. A user who desires to use a headset with an electronic device may connect the headset to the electronic device by inserting the headset plug into the mating audio jack on the electronic device. Miniature size (3.5 mm) phone jacks and plugs are commonly used electronic devices such as notebook computers and media players, because audio connectors such as these are relatively compact.

Headsets and other accessories have speakers that can be used to play back audio for a user. Some accessories have microphones. Microphones can be used to pick up the sound of a user's voice. This allows an electronic device to be used to record voice memos. Electronic devices with cellular telephone circuitry can use a microphone on an accessory to gather the user's voice during a telephone call.

In some headsets, microphones are used to form part of a noise cancellation circuit. When noise cancellation functions are active, the impact of ambient noise on audio playback can be reduced. Microphones can also be used to implement voice microphone noise cancellation.

Noise cancellation operations are generally implemented using analog noise cancellation circuitry. The analog noise cancellation circuitry subtracts a weighted version of the microphone signal from the audio signal.

Although conventional noise cancellation circuit arrangements can be satisfactory in some situations, recent advances in headphone quality and audio playback fidelity are placing increasing burdens on conventional noise cancellation circuits. These burdens are making it difficult or impossible to implement desired levels of noise cancellation performance with conventional approaches.

SUMMARY

Electronic devices and external equipment such as headsets and other accessories may handle digital audio signals.

An electronic device may be provided with audio digital signal processing circuitry and a transceiver. Switching circuitry may couple circuitry in the electronic device to an audio connector such as a 3.5 mm audio jack.

An accessory such as a headset may have a cable with a matching 3.5 mm audio connector. The accessory may have speakers. A voice microphone may be provided in the headset to gather a user's voice.

Noise cancellation microphones may be associated with the speakers and the voice microphone. Digital noise cancellation circuitry in the headset may reduce noise by processing digital audio signals and digital noise signals from the noise cancellation microphones.

Digital voice signals from the voice microphone and digital voice microphone noise signals from a noise cancellation microphone that is associated with the voice microphone may be transmitted from the headset to the electronic device. The electronic device may cancel noise in the voice signals by processing the digital voice signals and the digital voice microphone noise signals using the audio digital signal processing circuitry.

Further features of the invention, its nature and various advantages will be more apparent from the accompanying drawings and the following detailed description of the preferred embodiments.

DETAILED DESCRIPTION

Figure 1:
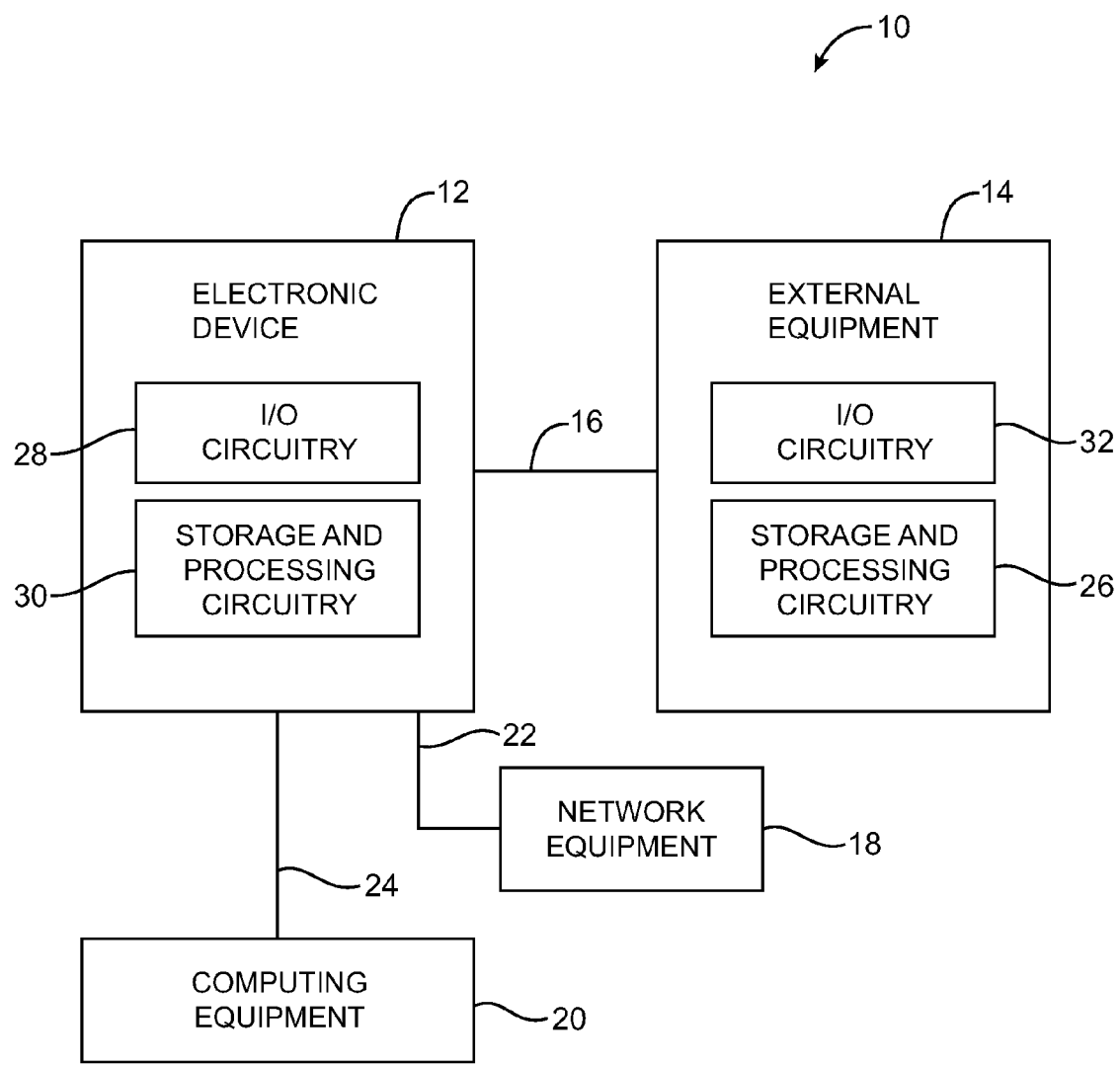
FIG. 1 is a schematic diagram of an illustrative electronic device in communication with an accessory such as a headset or other external equipment in a system in accordance with an embodiment of the present invention.

Electronic components such as electronic devices and other equipment may be interconnected using wired and wireless paths. For example, a wireless path may be used to connect a cellular telephone with a wireless base station. Wired paths may be used to connect electronic devices to equipment such as computer peripherals and audio accessories. As an example, a user may use a wired path to connect a portable music player to a headset.

Electronic devices that may be connected to external equipment using wired paths include desktop computers and portable electronic devices. The portable electronic devices that are connected to the external equipment in this way may include tablet computers, laptop computers, and small portable computers of the type that are sometimes referred to as ultraportables. The portable electronic devices may also include somewhat smaller portable electronic devices such as wrist-watch devices, pendant devices, and other wearable and miniature devices.

The electronic devices that are connected to external equipment using wired paths may also be handheld electronic devices such as cellular telephones, media players with wireless communications capabilities, handheld computers (also sometimes called personal digital assistants), remote controllers, global positioning system (GPS) devices, and handheld gaming devices. The electronic devices may be hybrid devices that combine the functionality of multiple conventional devices. Examples of hybrid electronic devices include a cellular telephone that includes media player functionality, a gaming device that includes a wireless communications capability, a cellular telephone that includes game and email functions, and a portable device that receives email, supports mobile telephone calls, has music player functionality, and supports web browsing. These are merely illustrative examples.

An example of external equipment that may be connected to such an electronic device by a wired path is an accessory such as a headset. A headset typically includes a pair of speakers that a user can use to play audio from the electronic device. The accessory may have a user control interface such as one or more buttons. When a user supplies input, the input may be conveyed to the electronic device. As an example, when the user presses a button on the accessory, a corresponding signal may be provided to the electronic device to direct the electronic device to take an appropriate action. Because the button is located on the headset rather than on the electronic device, a user may place the electronic device at a remote location such as on a table or in a pocket, while controlling the device using conveniently located headset buttons.

The external equipment that is connected by the wired path may also include equipment such as a tape adapter. A tape adapter may have an audio plug on one end and a cassette at the other end that slides into a tape deck such as an automobile tape deck. Equipment such as a tape adapter may be used to play music or other audio over the speakers associated with the tape deck. Audio equipment such as the stereo system in a user's home or automobile may also be connected to an electronic device using a wired path. As an example, a user may connect a music player to an automobile sound system using a three-pin or four-pin audio connector (e.g., TRS or TRRS connectors).

In a typical scenario, the electronic device that is connected to the external equipment with the wired path produces audio signals. These audio signals may be transmitted to the external equipment in the form of analog and digital audio. The external equipment may include a voice microphone. One or more noise cancelling microphones may also be provided. Microphone signals (e.g., analog audio signals corresponding to a user's voice, ambient noise, or other sounds) may be processed locally in the accessory. Microphone signals may also be conveyed to the electronic device using the wired path. The wired path may be used to convey signals such as power signals and control signals in addition to audio signals. Digital data may be conveyed if desired. The digital data may include, for example, control signals, audio, display information, etc.

If the electronic device is a media player and is in the process of playing a song or other media file for the user, the electronic device may be directed to pause the currently playing media file when the user presses a button associated with attached external equipment. As another example, if the electronic device is a cellular telephone with media player capabilities and the user is listening to a song when an incoming telephone call is received, actuation of a button on an accessory or other external equipment by the user may direct the electronic device to answer the incoming telephone call. Actions such as these may be taken, for example, while the media player or cellular telephone is stowed within a user's pocket.

Accessories such as headsets are typically connected to electronic devices using audio plugs (male audio connectors) and mating audio jacks (female audio connectors). Audio connectors such as these may be provided in a variety of form factors. Most commonly, audio connectors take the form of 3.5 mm (⅛") miniature plugs and jacks. Other sizes are also sometimes used such as 2.5 mm subminiature connectors and ¼ inch connectors. In the context of accessories such as headsets, these audio connectors and their associated cables can be used to carry analog signals such as audio signals for speakers and microphone signals. Digital data streams may also be used to convey audio signals (e.g., audio output signals such as played-back media or telephone call audio, microphone signals, and noise cancellation audio), control signals (e.g., input-output signals), clock information, and other signals. These digital signals may be conveyed over the 3.5 mm audio jack or other connectors. Optical connectors, which may be integrated with connectors such as audio jack connectors, may also be used to convey data between an electronic device and an associated accessory, particularly in environments that carry high bandwidth traffic such as video traffic. If desired, audio connectors such as 3.5 mm jacks and plugs may include optical communications structures to support this type of traffic.

The audio connectors that are used in connecting an electrical device to external equipment may have any suitable number of contacts. Stereo audio connectors typically have three contacts. The outermost end of an audio plug is typically referred to as the tip. The innermost portion of the plug is typically referred to as the sleeve. A ring contact lies between the tip and the sleeve. When using this terminology, stereo audio connectors such as these are sometimes referred to as tip-ring-sleeve (TRS) connectors. The sleeve can serve as ground. The tip contact can be used in conjunction with the sleeve to handle a left audio channel and the ring contact can be used in conjunction with the sleeve to handle the right channel of audio (as an example). In four-contact audio connectors, an additional ring contact is provided to form a connector of the type that is sometimes referred to as a tip-ring-ring-sleeve (TRRS) connector. Four-contact audio connectors may be used to handle a microphone signal, left and right audio channels, and ground (as an example).

Electrical devices and external equipment may be connected in various ways. For example, a user may connect either a pair of stereo headphones or a headset that contains stereo headphones and a microphone to a cellular telephone audio jack. Accessories such as these may include one or more noise cancelling microphones. For example, the voice microphone may have an associated noise cancellation microphone that picks up ambient noise in the vicinity of the voice microphone. The earbuds or other speakers in an accessory may also have noise cancellation microphones. For example, each earbud in a headset may have an external noise cancellation microphone on an outer surface of the earbud. In addition to the external noise cancellation microphone or instead of the external noise cancellation microphone, each earbud may have an internal noise cancellation microphone on an interior surface of the earbud (adjacent to the ear).

In accessories with more speakers, more noise cancellation microphones may be used. For example, additional noise cancellation microphones can be provided in earbuds that contain multiple drivers or in surround sound accessories. A surround sound accessory might, for example, have five or six speakers (or more) and might have a noise cancellation microphone that is adjacent to each respective speaker.

Electrical devices and external equipment may be operated in various modes. For example, a cellular telephone may be used in a music player mode to play back stereo audio to a user. When operated in telephone mode, the same cellular telephone may be used to play telephone call left and right audio signals to the user while simultaneously processing telephone call microphone signals from the user. Noise cancellation features may be selectively turned on and off as needed. For example, microphone noise cancellation may be activated while earbud noise cancellation features are deactivated (as an example). Noise cancellation functions can also be globally deactivated or globally activated.

Electronic devices and external equipment may be provided with path configuration circuitry that allows the electronic devices and external equipment to be operated in a variety of different operating modes in a variety of different combinations. When, for example, a user connects one type of accessory to an electronic device, the path configuration circuitry may be adjusted to form a first set of paths between the electronic device and accessory. When a user connects a different type of accessory, the path configuration circuitry may be adjusted to form a second set of paths between the electronic device and accessory.

The first and second sets of paths may, for example, be used to route power supply voltages and other signals to and from the pins of an audio connector in different ways depending on the mode in which the electronic device and accessory are being used. For example, if it is desired to power only a microphone or other component that draws low amounts of power, power can be supplied through a relatively high-impedance microphone bias path. If, however, larger amounts of power are desired to power noise cancelling circuitry or other circuitry in an accessory, a low-impedance power supply voltage line may be switched into use in place of the high-impedance microphone bias path. Other connections can also be adjusted (e.g., to route audio signals to desired locations, to change where other analog and/or digital signals are provided, etc.).

To provide high performance in an accessory that supports noise cancellation, it may be desirable to implement noise cancellation operations using digital audio processing circuitry. Digital audio processing may be more accurate than analog processing in some circumstances and may introduce less noise onto an audio signal. In schemes in which digital audio signals are conveyed from the accessory to the electronic device, the circuit resources of the electronic device may be used to help implement desired functions. This may help reduce the amount of circuitry that is included in a given accessory and may help minimize accessory power consumption. Digital audio processing may also be performed using digital processing circuitry that is primarily or exclusively implemented within an accessory.

In configurations in which at least some of the communications between the electronic device and accessory are implemented using digital communications, the capacity of the electronic device and accessory to communicate can be enhanced. For example, digital communications may allow numerous channels of audio to be conveyed between the electronic device and accessory in real time. Control signals and other signals may also be conveyed digitally. At the same time, the electronic device may, if desired, include analog circuitry that produces analog audio signals. When an accessory with digital communications capabilities is connected to the electronic device, the electronic device and accessory can communicate digitally. When an accessory without digital communications capabilities is connected to the electronic device, analog circuitry in the electronic device may supply analog audio signals to the accessory. For example, if a stereo headset with two speakers and no microphone or control capabilities is connected to the electronic device, analog audio circuitry may be used to supply left and right channels of analog audio to the speakers in the stereo headset. When a more advanced accessory is connected to the electronic device, additional features may become available (e.g., digital audio processing for noise reduction, digital control capabilities, additional audio streams for surround sound speakers, etc.).

An illustrative system in which an electronic device and external equipment may communicate over a wired path is shown in FIG. 1. As shown in FIG. 1, system 10 may include an electronic device such as electronic device 12 and external equipment 14. External equipment 14 may be equipment such as an automobile with a sound system, consumer electronic equipment such as a television or audio receiver with audio capabilities, a peer device (e.g., another electronic device such as device 12), or any other suitable electronic equipment. In a typical scenario, which is sometimes described herein as an example, external equipment 14 may be an accessory that contains speakers such as a headset. External equipment 14 is therefore sometimes referred to as "accessory 14" or "headset 14." Speakers in accessory 14 may be provided as earbuds or as part of a headset or may be provided as a set of stand-alone powered or unpowered speakers (e.g., desktop speakers). As shown in FIG. 1, equipment 14 may include I/O circuitry 32 and storage and processing circuitry 26.

A path such as path 16 may be used to connect electronic device 12 and accessory 14. In a typical arrangement, path 16 includes one or more audio connectors such as 3.5 mm plugs and jacks or audio connectors of other suitable sizes. Conductive lines in path 16 may be used to convey signals over path 16. There may, in general, be any suitable number of lines in path 16. For example, there may be two, three, four, five, or more than five separate lines. These lines may be part of one or more cables. Cables may include solid wire, stranded wire, shielding, single ground structures, multi-ground structures, twisted pair structures, or any other suitable cabling structures. Extension cord and adapter arrangements may be used as part of path 16 if desired. In an adapter arrangement, some of the features of accessory 14 such as user interface and communications functions may be provided in the form of an adapter accessory with which an auxiliary accessory such as a headset may be connected to device 12.

Electronic device 12 may be a desktop or portable computer, a portable electronic device such as a handheld electronic device that has wireless capabilities, equipment such as a television or audio receiver, or any other suitable electronic equipment. Electronic device 12 may be provided in the form of stand-alone equipment (e.g., a handheld device that is carried in the pocket of a user) or may be provided as an embedded system. Examples of systems in which device 12 may be embedded include automobiles, boats, airplanes, homes, security systems, media distribution systems for commercial and home applications, display equipment (e.g., computer monitors and televisions), etc.

Device 12 may include input-output circuitry 28 and storage and processing circuitry 30. Input-output circuitry 28 of device 12 and input-output circuitry 32 of equipment 14 may include buttons, touch-sensitive components such as touch screens and touch pads, microphones, sensors, and other components for gathering input from a user. Input-output circuitry 32 and 28 may also include speakers, status inductors such as light-emitting diodes, displays, and other components for providing output to users. Circuitry 32 and 28 may also include digital and analog communications circuitry for supporting communications over path 16 and for supporting wireless communications. Storage and processing circuitry 26 and 30 may be based on microprocessors, application-specific integrated circuits, audio chips (codecs), video integrated circuits, microcontrollers, digital signal processors, memory devices such as solid state storage, volatile memory, and hard disk drives, etc.

Device 12 may communicate with network equipment such as equipment 18 over path 22. Path 22 may be, for example, a cellular telephone wireless path. Equipment 18 may be, for example, a cellular telephone network. Device 12 and network equipment 18 may communicate over path 22 when it is desired to connect device 12 to a cellular telephone network (e.g., to handle voice telephone calls to transfer data over cellular telephone links, etc.).

Device 12 may also communicate with equipment such as computing equipment 20 over path 24. Path 24 may be a wired or wireless path. Computing equipment 20 may be a computer, a set-top box, audio-visual equipment such as a receiver, a disc player or other media player, a game console, a network extender box, or any other suitable equipment.

In a typical scenario, device 12 may be, as an example, a handheld device that has media player and cellular telephone capabilities (sometimes referred to collectively as a cellular telephone). Accessory 14 may be a headset with a microphone and a user input interface such as a button-based interface for gathering user input. Path 16 may be a four or five conductor audio cable that is connected to devices 12 and 14 using 3.5 mm audio jacks and plugs (as an example). Computing equipment 20 may be a computer with which device 12 communicates (e.g., to synchronize a list of contacts, media files, etc.).

While paths such as path 24 may be based on commonly available digital connectors such as USB or IEEE 1394 connectors, it may be advantageous to use standard audio connectors such as a 3.5 mm audio connector to connect device 12 to accessory 14. Connectors such as these are in wide use for handling audio signals. As a result, many users have a collection of headsets and other accessories that use 3.5 mm audio connectors. The use of audio connectors such as these may therefore be helpful to users who would like to connect their existing audio equipment to device 12. Consider, as an example, a user of a media player device. Media players are well known devices for playing media files such as audio files and video files that contain an audio track. Many owners of media players own one or more headsets that have audio plugs that are compatible with standard audio jacks. It would therefore be helpful to users such as these to provide device 12 with such a compatible audio jack, notwithstanding the potential availability of additional ports such as USB and IEEE 1394 high speed digital data ports for communicating with external devices such as computing equipment 20.

In system 10, electronic device 12 and accessory 14 may include switching circuitry (also sometimes referred to as adjustable path configuration circuitry) that can be used to selectively interconnect various circuits to the contacts in the audio connectors of path 16. The switching circuitry may be adjusted to support different modes of operation. These different modes of operation may result from different combinations of accessories and electronic devices, scenarios in which different device applications are active, etc. The switching circuitry may be formed from one or more transistor-based switches. If desired, the switching circuitry may include hybrid circuits that can be selectively switched into use. When the hybrid circuits are not actively used, the communications line to which they are connected may be used for unidirectional communications. When the hybrid circuits are switched into active use, the same communications line may be used to support bidirectional signals (e.g., an outgoing left or right audio channel in one direction and an incoming microphone signal in the opposite direction). Bidirectionality may also be supported using time multiplexing protocols.

Figure 2:
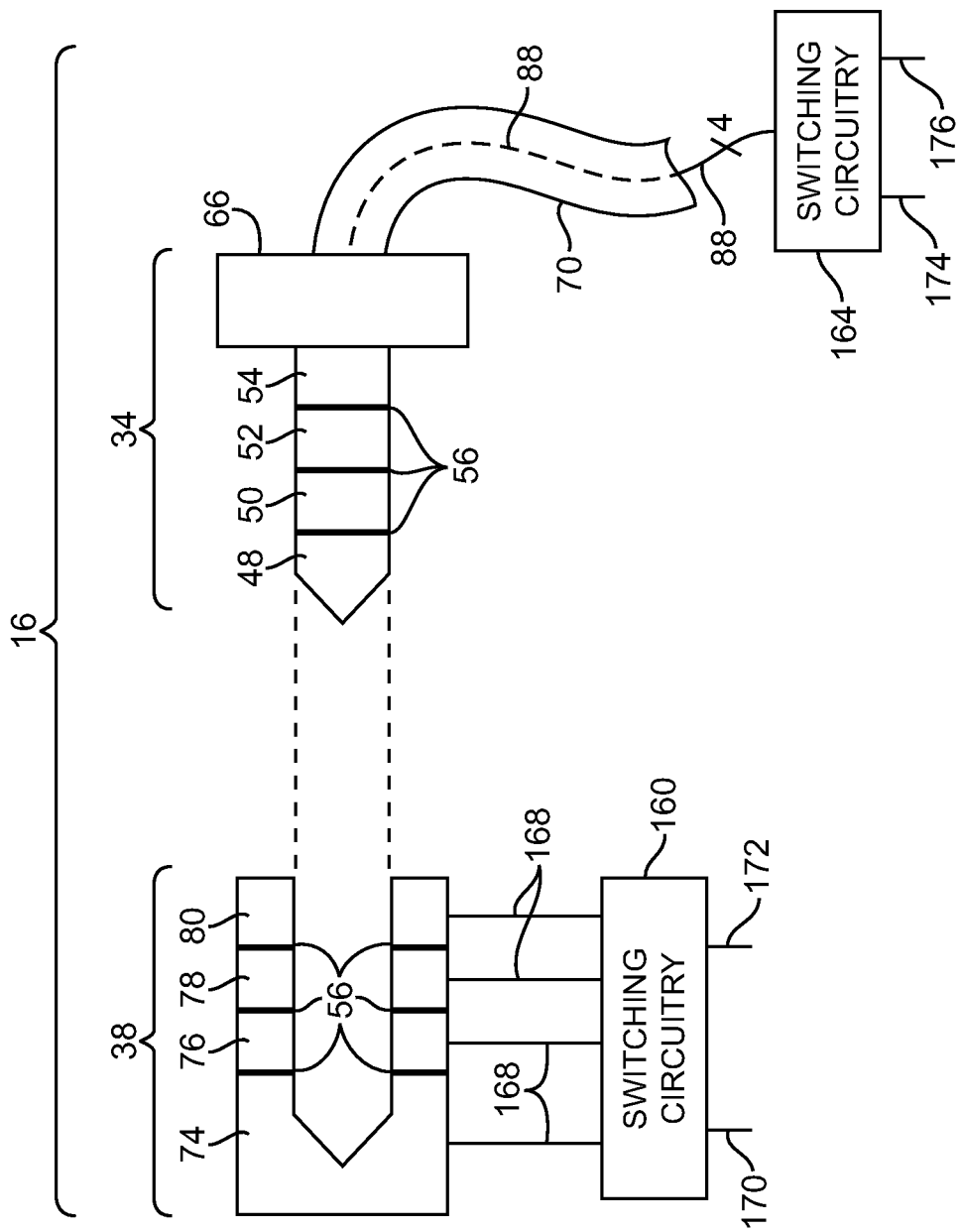
FIG. 2 is a diagram showing how a communications path that includes an audio connector can be used to allow a device and external equipment to interact in accordance with an embodiment of the present invention.

Illustrative circuitry that may be associated with path 16 is shown in FIG. 2. Switching circuitry 160 may be provided in electronic device 12 and switching circuitry 162 may be provided in accessory 14 or other external equipment. Wired path 16 may be used to connect electronic device 12 and accessory 14. Path 16 may include audio connectors such as audio connectors 34 and 38.

The audio connectors of path 16 may include an audio plug such as plug 34 (i.e., a male audio connector). Plug 34 may mate with a corresponding audio jack such as audio jack 38 (i.e., a female audio connector). Connectors 34 and 38 may be used at any suitable location or locations within path 16. For example, audio jacks such as jack 38 can be formed within the housing of device 12 and plugs such as plug 34 can be formed on the end of a cable such as cable 70 that is associated with a headset or other accessory 14. As shown in FIG. 2, cable 70 may be connected to audio plug 34 via strain-relief plug structure 66. Structures such as structure 66 may be formed with an external insulator such as plastic (as an example).

Audio plug 34 is an example of a four-contact plug. A four-contact plug has four conductive regions that mate with four corresponding conductive regions in a four-contact jack such as jack 38. As shown in FIG. 2, these regions may include a tip region such as region 48, ring regions such as rings 50 and 52, and a sleeve region such as region 54. These regions surround the cylindrical surface of plug 34 and are separated by insulating regions 56. When plug 34 is inserted in mating jack 38, tip region 48 may make electrical contact with jack tip contact 74, rings 50 and 52 may mate with respective ring regions 76 and 78, and sleeve 54 may make contact with sleeve terminal 80. Insulating regions 56 may separate the contacts in jack 38. In a typical configuration, there are four wires 88 in cable 70, each of which is electrically connected to a respective contact in plug 34.

Switching circuitry 160 may receive analog signals via path 170. For example, switching circuitry 160 may receive analog audio output signals on path 170 and may switch these signals onto lines 168 when operating in an analog output mode to support legacy analog accessories. Switching circuitry 160 may handle digital signals using path 172. For example, when operating in a digital audio mode to support a digital-ready headset, switching circuitry 160 may switch digital audio streams that are received on path 172 onto lines 168.

Accessories may have fixed operating modes or adjustable operating modes. For example, a legacy analog headset may only operate in an analog audio mode. As another example, a digital-capable headset may operate in both analog and digital modes. This type of multimode operation may allow a digital-capable headset to revert to an analog audio mode when used with a legacy music player. To accommodate multiple operating modes, accessory 14 may control the configuration of the switches in switching circuitry 164. When operating in analog audio mode, analog signals that are being conveyed between device 12 and accessory 14 can be routed through analog lines 174. When operating in digital audio mode, switching circuitry 164 can be configured to connect digital path 176 into place. These switch configurations need not be mutually exclusive. For example, switching circuitry 160 and 164 may, if desired, be placed into configurations in which a mixture of analog and digital signals are conveyed over path 16. A typical mixture of signals over path 16 might include power signals, control signals, and audio signals. Switching circuitry 164 may, if desired, be used to switch an ultrasonic tone generation circuit into use (e.g., to send ultrasonic tone codes from accessory 14 to device 12 that correspond to button press events or other user input).

The signal assignments that are used in the audio connectors of path 16 depend on the type of electronic device and accessory being used and the active operating mode for the system. For example, when operating in a legacy analog mode, ring contact 52 may serve as ground (and may therefore sometimes be referred to as the G contact of plug 34), tip 48 may be associated with left channel audio (and may therefore sometimes be referred to as the L contact of plug 34), ring 50 may be associated with right channel audio (and may therefore sometimes be referred to as the R contact of plug 34), and sleeve 54 may be associated with microphone signals (and may therefore sometimes be referred to as the M contact of plug 34). The mating contacts of jack 38 may have corresponding signal assignments.

Figure 3:
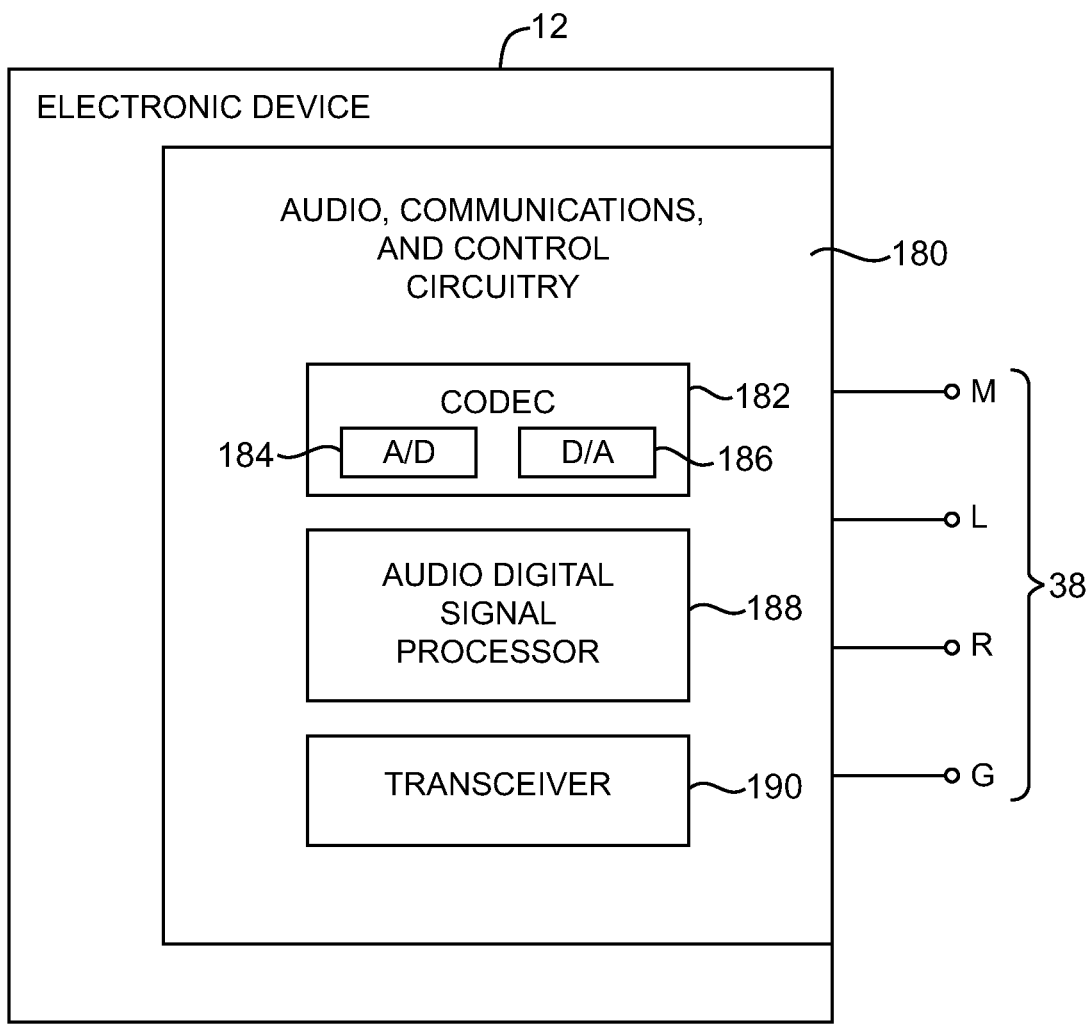
FIG. 3 is a schematic diagram showing illustrative circuitry that may be used in an electronic device to communicate with an accessory and to provide audio processing functions in accordance with an embodiment of the present invention.

As shown in FIG. 3, electronic device 12 may contain audio, communications, and control circuitry 180. Circuitry 180 may include an audio circuit such as circuit 182. Audio circuit 182, which is sometimes referred to as a codec or audio codec, may include analog-to-digital (A/D) converter circuitry 184 and digital-to-analog (D/A) converter circuitry 186. Analog-to-digital converter circuitry in device 12 may be used to digitize analog signals such as analog audio signals. For example, analog-to-digital converter circuitry 184 may be used to digitize one or more analog microphone signals. These microphone signals may be received from accessory 14 over path 16 or may be received from microphone equipment in device 12. Digital-to-analog converter circuitry 186 may be used to generate analog output signals. For example, digital-to-analog converter circuitry 186 may receive digital signals corresponding to the audio portion of a media playback event, audio for a telephone call, noise cancellation signals, an alert tone or signal (e.g., a beep or ring), or any other digital information. Based on this digital information, digital-to-analog converter circuitry 186 may produce corresponding analog signals (e.g., analog audio).

Audio digital signal processor 188 may be used to perform digital signal processing on digitized audio signals. For example, if operating accessory 14 in a voice microphone noise cancellation mode, digital noise cancellation signals from a voice microphone noise cancellation microphone in accessory 14 may be conveyed over path 16 to audio digital signal processor 188. Audio digital signal processor 188 may also receive digital audio voice signals from the voice microphone in accessory 14. Using the processing capabilities of audio digital signal processor 188, the digital noise cancellation microphone signals from accessory 14 can be digitally removed from the digital audio voice signal. Use of the processing power of device 12 in this way may help to reduce the processing burden that is placed on accessory 14. This may allow accessory 14 to be constructed from less costly and less complex circuitry. Power consumption efficiency and audio performance may also be enhanced. If desired, digital audio processing circuitry in accessory 14 can be used to supplement or replace the audio processing functions of audio digital signal processor 188. For example, digital noise cancellation circuitry in accessory 14 may be used in cancelling noise for the speakers of accessory 14.

Transceiver 190 may be used to support unidirectional or bidirectional digital communications with a corresponding transceiver in accessory 14 over path 16. Any suitable communications protocol may be used. For example, a protocol may be used that includes functions such as error correction functions. Data may be sent in packets or other suitable data structures. A clock that is produced by circuitry 180 of FIG. 3 (e.g., by circuitry in transceiver 190) may be transmitted with the data. For example, transceiver 190 may embed a variable clock in a transmitted digital data stream. The clock, which is sometimes referred to as a data clock, may have a frequency in the range of 1 MHz to 32 MHz (as an example).

Switching circuitry such as switching circuitry 160 of FIG. 2 may be used to selectively connect the contacts of audio connector 38 to the circuits of audio, communications, and control circuitry 180. For example, when it is desired to supply analog audio output signals from codec 182 to connector 38, the switching circuitry can be adjusted accordingly by the control and processing circuitry of device 12. When it is desired to route digital signals to the audio contacts of audio connector 38, the switching circuitry can be used to connect transceiver 190 to audio connector 38. Power signals and other signals can also be selectively routed to connector 38 by switching circuitry 160.

Figure 4:
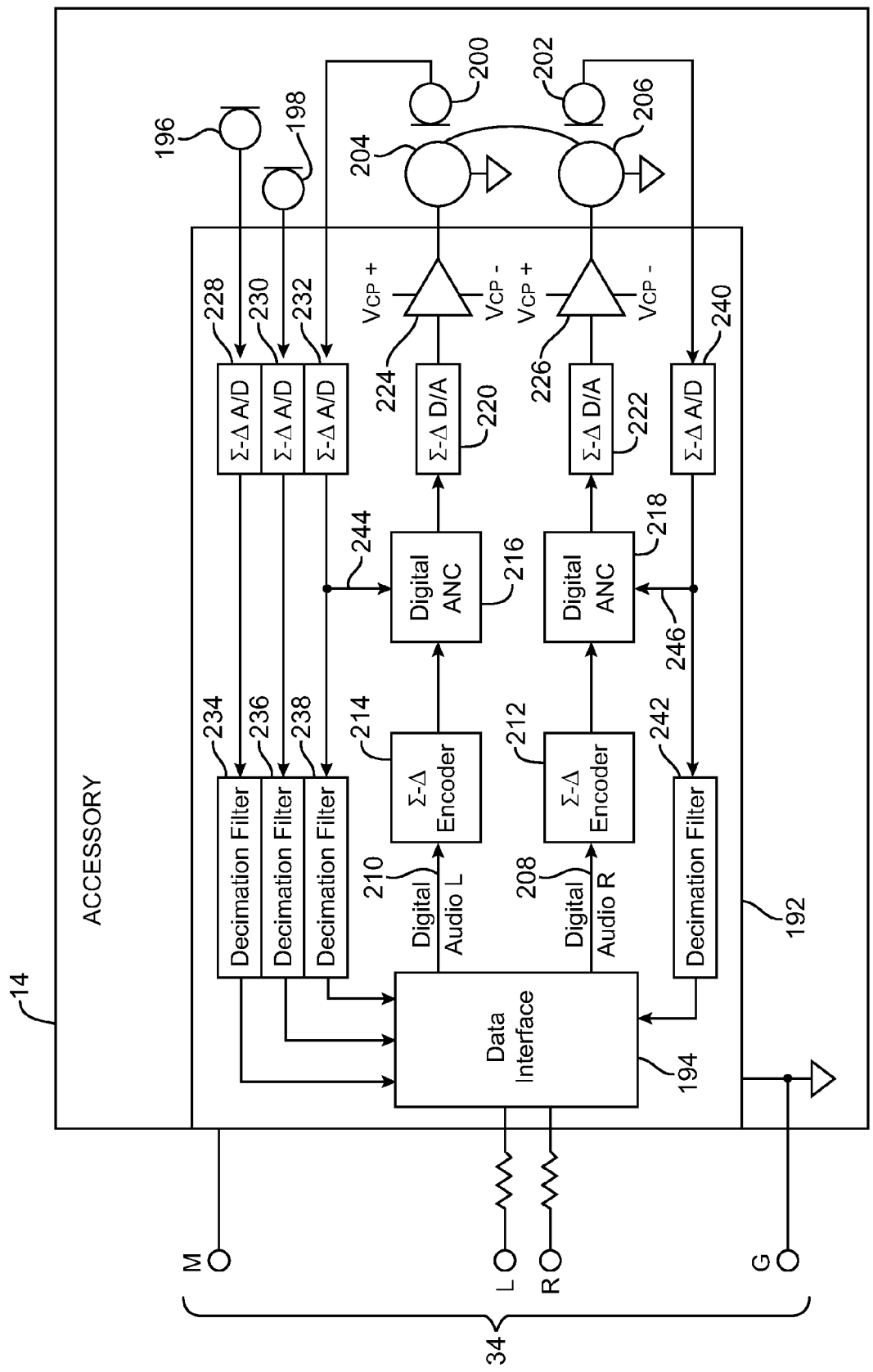
FIG. 4 is a circuit diagram of illustrative audio and communications circuitry in an accessory that communicates with circuitry in an electronic device such as the circuitry of FIG. 3 in accordance with an embodiment of the present invention.

Illustrative circuitry that may be used to handle digital audio signal processing tasks for accessory 14 is shown in FIG. 4. As shown in FIG. 4, accessory 14 may include control circuitry 192. Control circuitry 192 may include analog-to-digital and digital-to-analog converter circuitry. Data interface circuitry 194 may include transceiver circuitry for communicating with transceiver 190 of device 12 (FIG. 3). Data interface circuitry 194 may also include circuitry for extracting an embedded clock (data clock) from the digital signals that are transmitted from device 12 over path 16. The contacts in connector 34 (M, L, R, and G) may be selectively connected to the circuitry in accessory 14 by switching circuitry such as switching circuitry 164 of FIG. 2. For example, the L and R contacts may be connected to data interface 194 and the M and G contacts may be routed respectively to a positive power supply terminal and a ground terminal in accessory 14 (e.g., to deliver power received from device 12 to circuitry in accessory 14).

In the example of FIG. 4, accessory 14 has four microphones. Voice microphone 196 may be used to gather audio from a user's voice during a telephone call or may be used to record audio clips (as examples). Microphone 198 may serve as a noise cancellation microphone for voice microphone 196. Speakers 204 and 206 may be used to play audio to a user. When presenting a user with stereo audio, for example, speaker 204 may be used to play left channel audio and speaker 206 may be used to play right channel audio. Microphone 200 may serve as a noise cancellation microphone for speaker 204. Microphone 202 may serve as a noise cancellation microphone for speaker 206.

When playing back audio for a user, digital audio signals may be received from device 12. For example, data interface 194 may receive digital data streams (e.g., using L and R contacts in connector 34). Digital audio signals may be routed from interface 194 to encoder circuits 214 and 212 (e.g., sigma-delta encoders) over paths 210 and 208, respectively. The encoded digital outputs of encoders 214 and 212 may be provided to respective digital noise cancellation circuits 216 and 218. Circuits 216 and 218 may use information on ambient noise from noise cancellation microphones 200 and 202 to reduce noise in the played back audio signals (i.e., to implement noise cancellation for speakers 204 and 206).

The outputs of digital noise cancellation circuits 216 and 218 may be provided to digital-to-analog converter circuitry such as sigma-delta digital-to-analog converters 220 and 222. Corresponding analog audio output signals from circuits 220 and 222 may be amplified using speaker drivers (amplifiers) 224 and 226. The output of amplifier 224 may be provided to speaker 204. The output of amplifier 226 may be provided to speaker 206.

Microphones 196, 198, 200, and 202 may produce analog microphone signals that are digitized using respective sigma-delta analog-to-digital converters 228, 230, 232, and 240. The outputs of converters 228, 230, 232, and 240 may be digitally filtered (e.g., using respective decimation filters such as filters 234, 236, 238, and 242).

Noise cancellation operations for voice microphone 196 may be performed in device 12. For example, digital audio streams from voice microphone 196 and corresponding noise cancellation microphone 198 may be transmitted to audio digital signal processor 188 (FIG. 3) for noise cancellation processing.

Noise cancellation operations for speakers 200 and 202 may be performed locally in accessory 14 using circuitry 192. For example, noise cancellation microphone signals from noise cancellation microphone 200 may be routed to digital noise cancellation circuit 216 using path 244. Similarly, noise cancellation microphone signals from noise cancellation microphone 202 may be routed to digital noise cancellation circuit 218 using path 246.

Figure 5:
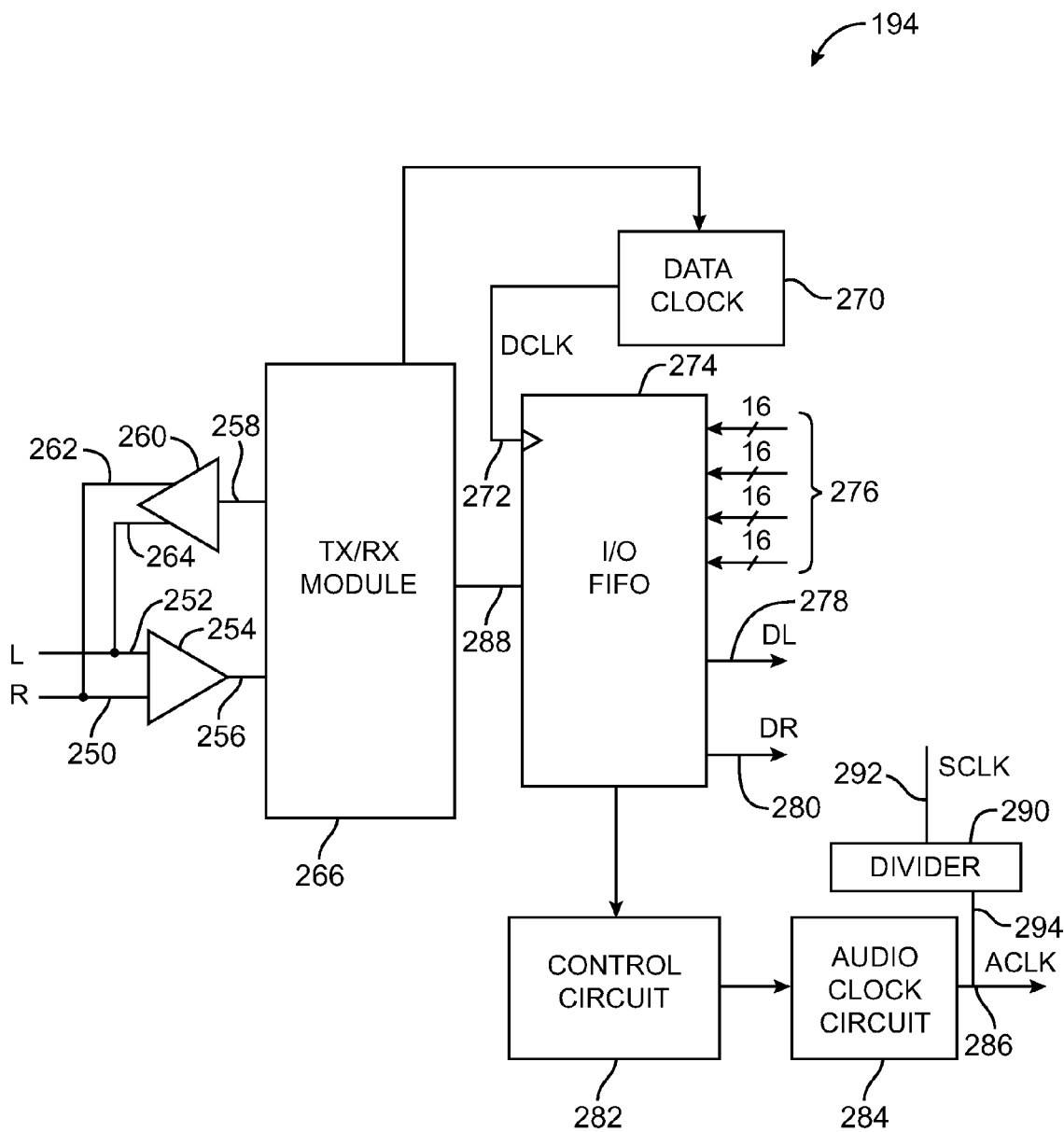
FIG. 5 is a circuit diagram of illustrative communications circuitry in an accessory in accordance with an embodiment of the present invention.

Illustrative circuitry that may be used in implementing data interface 194 is shown in FIG. 5. As shown in FIG. 5, the L and R contacts of connector 34 may be coupled to inputs 252 and 250 of input amplifier 254 (e.g., using series termination resistors). Amplifier 254 may be a differential amplifier that converts differential data on lines 252 and 250 into single-ended data (i.e., data signals referenced to ground) on output 256. The signals that are received at the input to amplifier 254 may be, for example, low-voltage differential signals having frequencies (bit rates) of 1-32 MHz and voltages of 2-400 mV (as an example). The rate at which signals are transmitted can be selected from a set of predefined rates (e.g., based on a variable clock at 6 MHz, 12 MHz, and 24 MHz). High clock rates can be used when high data transfer capabilities are desired and low clock rates can be used when high data transfer capabilities are not required (e.g., when it is desired to lower the clock rate to minimize radiated emissions and to conserve power). The use of low-voltage differential signaling schemes for path 16 may help minimize interference and reduce undesired radiation from cable 70 (FIG. 2). Symmetrical or asymmetrical bidirectional communications may be supported over path 16. For example, upstream data transfers from device 12 to accessory 14 may be performed at up to 12 Mbps (e.g., to convey up to 5 channels of audio output of up to 24 bits each at up to 96 kHz) and downstream data transfers from accessory 14 to device 12 may be performed at up to 4 Mbps (e.g., to convey up to 5 channels of microphone signals of up to 16 bits each at up to 48 kHz).

Received data from the output of input amplifier (buffer) 254 may be provided to transceiver module 266. Transceiver module 266 may provide the received data to input-output first-in-first-out (FIFO) buffer 274. During data transmission operations, data may be provided from buffer 274 to transceiver module 266 and may be driven onto the L and R contacts using output line 258, differential output amplifier 260, and differential outputs 262 and 264.

The digital data stream that is received by transceiver module 266 may have an associated (e.g., embedded) clock. This clock can be extracted from the incoming data stream using clock and data recovery circuitry in circuit 194 (e.g., circuitry in transceiver module 266). Transceiver 266 can output the extracted clock as a data clock signal or can use extracted clock information to adjust a data clock signal produced by data clock 270.

Data clock signal DCLK is received at clock input 272 of buffer 274 and clocks data into and out of the registers of buffer 274 during operation. When receiving data from path 16, data is clocked into buffer 274 from transceiver 274 using path 288. Corresponding digital audio signals may be supplied at outputs 278 and 280. For example, a stream of digital audio data DL for a left audio channel may be supplied at path 278 and a stream of digital audio data DR for a right audio channel may be supplied at path 280. When transmitting digital data to device 12 over path 16, digital data may be received at inputs 276 of buffer 274. After flowing through buffer 274, this data may be provided to transceiver module 266 over path 288. Paths 276 may be, for example, 16-bit or 32-bit buses that are connected to the outputs of decimation filters 234, 236, 238, and 242 (FIG. 4).

An audio clock signal ACLK may be produced based on the received clock. Audio clock signal ACLK may be produced at output 286 of audio clock circuit 284. Transceiver circuitry 190 of FIG. 3 can transmit periodic time stamps from device 12 to accessory 14. Control circuit 282 may receive the periodic time stamps from transceiver 266 and buffer 274 and can adjust audio clock circuit 284 to ensure that audio clock signal ACLK is accurate.

Divider 290 may receive audio clock signal ACLK via path 294 and may divide ACLK (e.g., by 64 or other suitable number) to produce a corresponding lower-frequency sample clock signals SCLK on output line 292. Sample clock SCLK and audio clock ACLK may be used in audio signal processing operations in circuitry 192.

Figure 6:
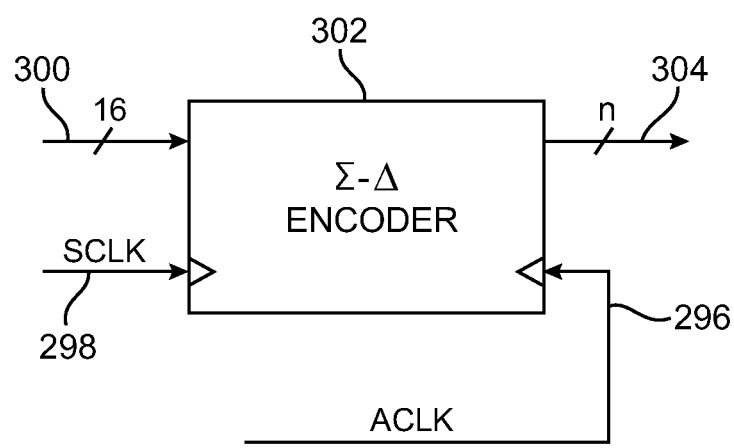
FIG. 6 is a circuit diagram of an illustrative encoding circuit in accordance with an embodiment of the present invention.

As shown in FIG. 6, for example, audio clock ALCK may be provided to clock input 296 of sigma-delta encoder 302 and sample clock SCLK may be provide to sample clock input 298 of sigma-delta encoder 302. Circuitry of the type shown in FIG. 6 may be used for sigma-delta encoders such as encoders 214 and 212 of FIG. 4. Digital data from transceiver 266 (FIG. 4) may be provided to input 300 and corresponding sigma-delta encoded digital output data (of width n corresponding to the width of encoder 302) may be supplied at encoder output 304. The data on path 300 may be clocked into encoder 302 using clock SLCK. The data on path 304 may be clocked out of encoder 302 using clock ACLK. As shown in FIG. 4, the output of sigma-delta encoder 214, which may be used to handle left channel digital audio, may be supplied to digital noise cancellation circuit 216. The output of sigma-delta encoder 212, which may be used to handle right channel digital audio, may be supplied to digital noise cancellation circuit 218.

Figure 7:
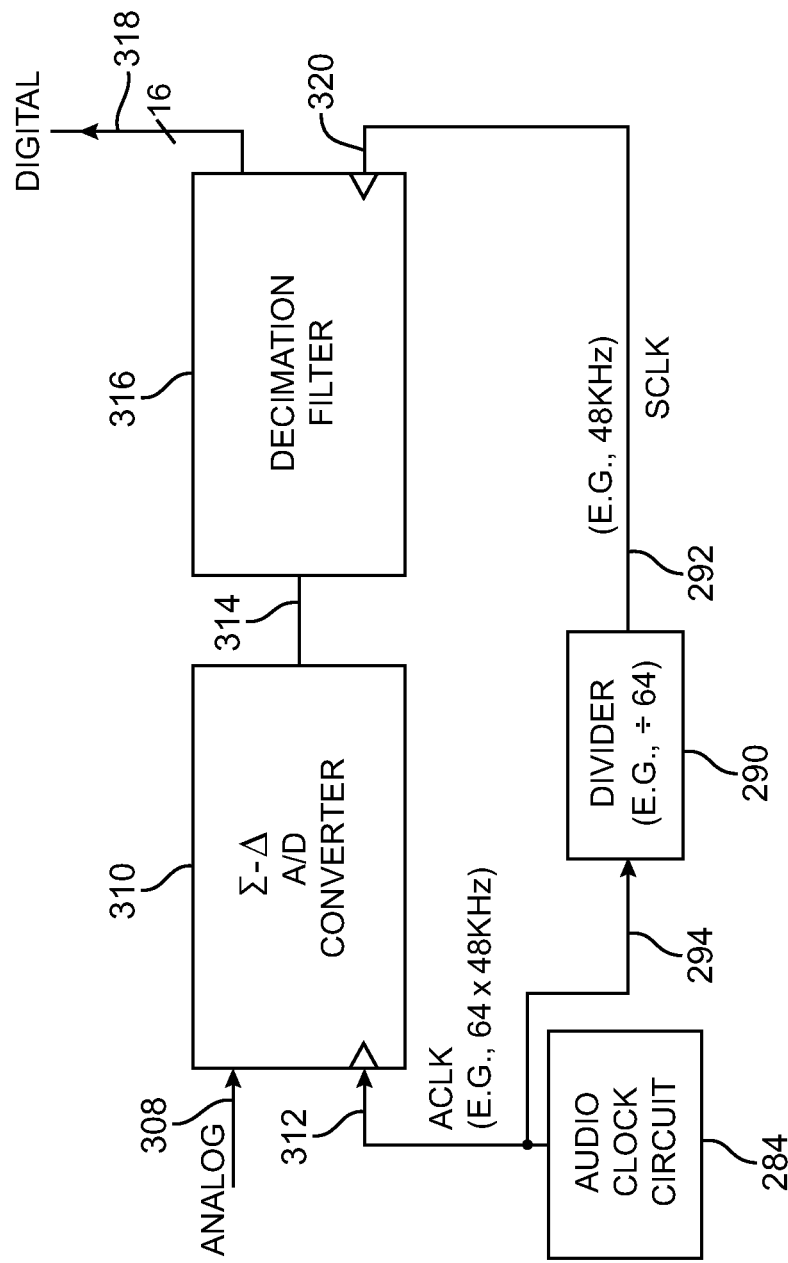
FIG. 7 is a circuit diagram of an illustrative circuit that may be used to convert analog audio signals into digital audio signals in accordance with an embodiment of the present invention.

FIG. 7 shows illustrative circuitry that may be used to handle analog-to-digital conversion operations in circuit 192. Audio clock circuit 284 (FIG. 5) may supply audio clock signal ACLK to audio clock input 312 of sigma-delta analog-to-digital converter 310. Converter 310 (i.e., one of converters 228, 230, 232, and 240 of FIG. 4), may receive analog input at input 308 (i.e., analog input from one of microphones 196, 198, 200, and 202 in FIG. 4). Sigma-delta analog-to-digital converter 310 may digitize the analog input on input 308 and may supply a corresponding digital output on output 314. Decimation filter 316 (i.e., one of decimation filters 342, 236, 238, and 242 of FIG. 4), may filter the digital signal on path 314 and may produce a corresponding filtered output on path 318. Decimation filter 316 may be clocked using sample clock SCLK. Audio clock 284 may produce audio clock signal ACLK. Divider 290 (e.g., a divide-by-64 divider circuit) may divide clock ACLK for path 294 to produce sample clock SCLK on path 292. Sample clock SCLK may be received at clock input 320 of decimation filter 316.

Digitized voice microphone signals from microphone 196 and digitized noise cancellation microphone signals from voice noise cancellation microphone 198 may be provided from the outputs of decimation filters 234 and 236 for transmission to device 12 over path 16 by transceiver 266. Device 12 may use audio digital signal processor 188 to process these signals. For example, audio digital signal processor 188 may remove noise from the voice microphone signal using the noise cancellation microphone signals from microphone 198.

If desired, transceiver 266 may also transmit noise cancellation microphone signals from noise cancellation microphones 200 and 202 to device 12. Audio digital signal processor 188 may also process noise cancellation signals from speaker noise cancellation microphones 200 and 202. However, there can be latencies associated with passing signals through decimation filters. To minimize delays and thereby ensure satisfactory noise cancellation for speakers 204 and 206, it may be preferable to perform digital audio processing functions for speaker noise cancellation using circuits such as digital noise cancellation circuits 216 and 218 of FIG. 4. Illustrative circuitry 322 that may be used in implementing noise cancellation circuits 216 and 218 is shown in FIG. 8.

Figure 8:
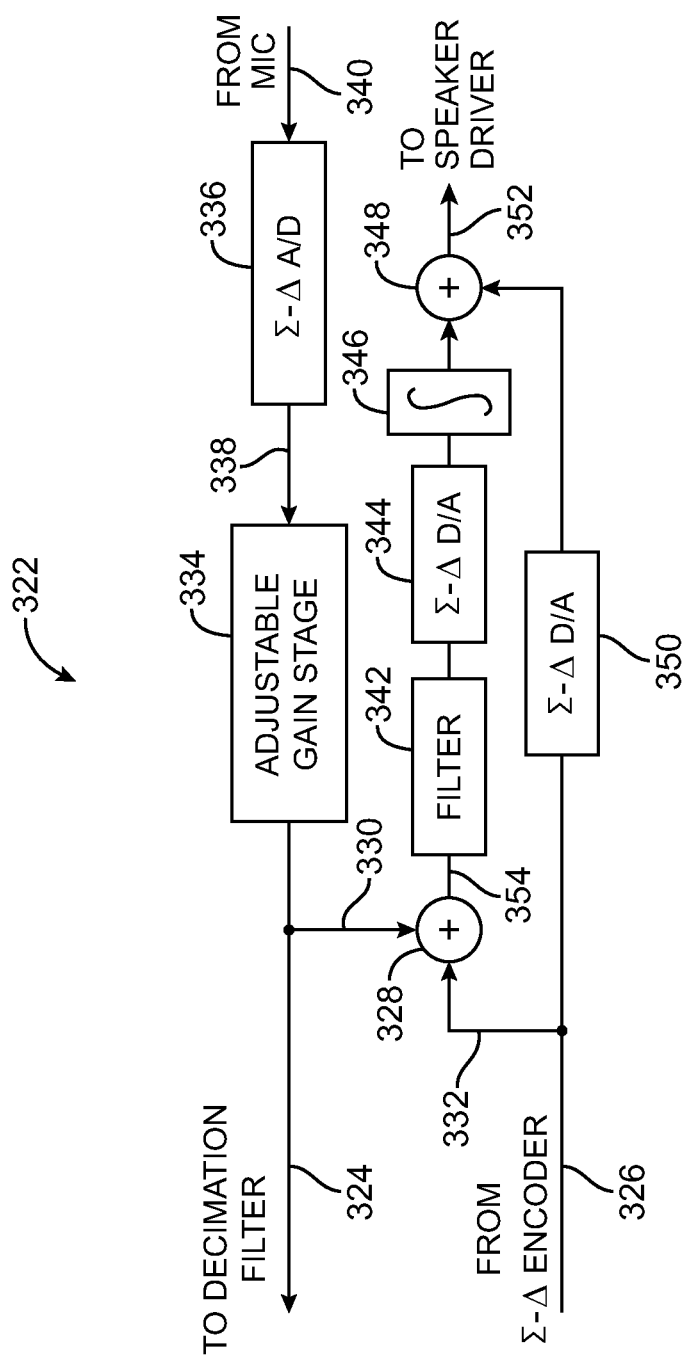
FIG. 8 is a circuit diagram of an illustrative digital noise cancellation circuit that may be used in an accessory in accordance with an embodiment of the present invention.

As shown in FIG. 8, digital noise cancellation circuitry 322 may receive digital audio on path 326. For example, circuitry 322 may receive output from encoder 214 or 212 of FIG. 4. The digital audio may correspond to left or right channel audio output from device 12 (as examples). Path 332 may be used to route the digital audio from path 326 to digital combiner circuit 328. Digital combiner circuit 328 may also receive digital input from path 330. Path 330 receives microphone noise cancellation signals from adjustable gain stage 334. Adjustable gain stage 334 also provides microphone noise cancellation signals to path 324. Path 324 may be used to provide the microphone noise cancellation signals to a decimation filter such as filter 238 or 242 of FIG. 4.

During typical operations, the digital audio signals on path 332 correspond to unmodified audio output and the signals on path 330 include ambient noise gathered from an appropriate noise cancellation microphone. Noise cancellation signals may be received on path 340 (i.e., from microphone 200 or 202 of FIG. 4). Sigma-delta analog to digital converter 336 converts the analog microphone signals on path 340 into corresponding digital microphone signals (digital noise signals) on path 338.

Optional adjustable gain stage 334 may be included in the path between microphone input 340 and input 330 to digital combiner circuit 328. Adjustable gain stage 334 may be used to impose a frequency-dependent gain characteristic between path 338 at the output of sigma-delta analog-to-digital converter 336 and paths 324 and 330. The frequency-dependent gain of gain stage 334 may be adjusted during operation of circuit 322. For example, the user of accessory 14 may adjust the gain characteristic of gain stage 334 to change the frequency components of the currently playing audio signal (e.g., to accentuate the bass portion of the signal or to accentuate the treble portion of the signal). In this way, adjustable gain stage 334 may be used to allow circuitry 322 to serve as an equalization circuit (e.g., to accommodate user audio preferences, to implement a frequency-dependent weighting scheme that models the way in which noise is perceived at the ear of the user, etc.). Adjustable gain stage 334 performs frequency-dependent weighting operations digitally (i.e., by weighting the digital output of analog-to-digital converter 336).

Circuit 322 may used feed-forward and feedback signal contributions to implement noise cancellation. Signals on path 326 may be converted to analog signals by sigma-delta digital-to-analog converter 350. These signals represent a "feed-forward" contribution to the analog output audio signal (analog speaker signal) on path 352. Microphone feedback may be received from the noise cancellation microphone using path 340.

The noise cancellation microphone that provides signals to path 340 (i.e., noise cancellation microphone 200 or 202 of FIG. 4) may be located within an earbud adjacent to a speaker (i.e., adjacent to speaker 204 or 206). In this configuration, the noise cancellation microphone will pick up both audio output (feedback) and ambient noise. Circuit 322 may isolate the noise component of the noise cancellation microphone signal by digitally combining the signal on path 330 with the signal on path 332 using digital combiner circuit 328 (e.g., by subtracting the audio output signal from the combined audio and microphone signal). The resulting digital audio signal on path 354 represents the ambient noise that is to be cancelled. Signals on output 354 of circuit 328 may be filtered using filter 342 and may be converted from digital to analog using sigma-delta digital-to-analog converter 344. The analog output of digital-to-analog converter 344 may be integrated using integrator 346 and provided to combiner 348 to cancel noise from the outgoing audio signal. Combiner 348 may receive the outgoing audio signals from the audio feed-forward path (i.e., the output of digital-to-analog converter 350) and may produce a corresponding audio output signal on path 352 from which noise has been cancelled.

If desired, noise cancellation may be implemented using other schemes. For example, noise cancellation may be implemented using a feed-forward scheme without feedback. In this type of scheme, the noise cancellation microphone for each speaker may be mounted on an external portion of the speaker housing (e.g. on the outside of an earbud). A modeling circuit may be used to model the transfer function of the earbud (e.g., to account for attenuation of high-frequency noise by the earbud material). The noise that is picked up by the external noise cancelling microphone may be passed through the modeling circuit and subtracted from the audio output (e.g., the left or right channel of audio received from device 12). The modeling circuit and the combining circuit that is used to subtract the noise from the output may be implemented using analog circuitry or using digital noise cancellation circuitry.

The foregoing is merely illustrative of the principles of this invention and various modifications can be made by those skilled in the art without departing from the scope and spirit of the invention.

What is claimed is:

1. An electronic device that is coupled to a headset over a wired communications path, comprising:
    an audio connector coupled to the wired communications path; and
    circuitry that receives digital voice microphone signals from the headset through the audio connector, the circuitry comprising a transceiver, wherein the audio connector comprises four contacts, and wherein the digital voice microphone signals comprise differential signals received by the transceiver over a pair of the contacts, using a differential signaling scheme.

2. The electronic device defined in claim 1 wherein the circuitry is configured to perform noise cancellation operations based at least partly on the digital voice microphone signals.

3. The electronic device defined in claim 2 further comprising a digital-to-analog converter that produces analog output signals that are transmitted through the audio connector.

4. The electronic device defined in claim 1 wherein the audio connector comprises a 3.5 mm audio connector.

5. The electronic device defined in claim 1 wherein the audio connector comprises a four-contact audio jack.

6. The electronic device defined in claim 1 wherein the circuitry comprises an audio digital signal processor.

7. The electronic device defined in claim 1 wherein the circuitry comprises an audio digital signal processor that receives the digital voice microphone signals from a voice microphone in the headset and that receives digital voice noise cancellation signals from a noise cancellation microphone associated with the voice microphone in the headset and wherein the audio digital signal processor is configured to perform noise cancellation operations based at least partly on the digital voice microphone signals and the digital voice noise cancellation signals.

8. An electronic device that is coupled to a headset over a wired communications path, the electronic device comprising:
- an audio connector coupled to the wired communications path;
- an audio digital signal processor that receives digital noise cancellation signals from the headset through the audio connector; and
- a transceiver, wherein the audio connector comprises four contacts and wherein the digital noise cancellation signals comprise differential signals received by the transceiver over a pair of the contacts, using a differential signaling scheme.

9. The electronic device defined in claim 8 wherein the electronic device is an electronic device selected from the group consisting of: a cellular telephone, a laptop computer, a tablet computer, an ultraportable computer, and a media player that has wireless communications capabilities.

10. The electronic device defined in claim 8 wherein the audio digital signal processor is configured to perform noise cancellation operations based at least partly on the digital noise cancellation signals.

11. The electronic device defined in claim 10 further comprising a digital-to-analog converter that produces analog output signals that are transmitted through the audio connector.

12. The electronic device defined in claim 8 wherein the audio connector comprises a 3.5 mm audio connector.

13. The electronic device defined in claim 8 wherein the audio connector comprises a four-contact audio jack.

14. The electronic device defined in claim 8 further comprising a transceiver that transmits digital audio signals to the headset through the audio connector.

15. An electronic device that is coupled to a headset over a wired communications path, the electronic device comprising:
- an audio connector having four contacts; and
- circuitry that transmits digital audio signals to the headset over at least a given one of the four contacts in the wired communications path and that receives digital audio signals from the headset over at least the given one of the four contacts in the wired communications path;
- wherein the received digital audio signals comprise digital voice microphone signals and digital voice noise cancellation signals received from the headset through the audio connector and wherein the circuitry comprises an audio digital signal processor configured to perform noise cancellation operations based at least partly on the digital voice microphone signals and the digital voice noise cancellation signals.

16. The electronic device defined in claim 15 wherein the audio connector comprises a 3.5 mm audio connector.

17. The electronic device defined in claim 15 wherein the audio connector comprises a 3.5 mm audio connector and wherein the transmitted digital audio signals comprise right and left audio channels and at least one additional surround sound audio channel.

* * * * *